BEST AVAILABLE COPY

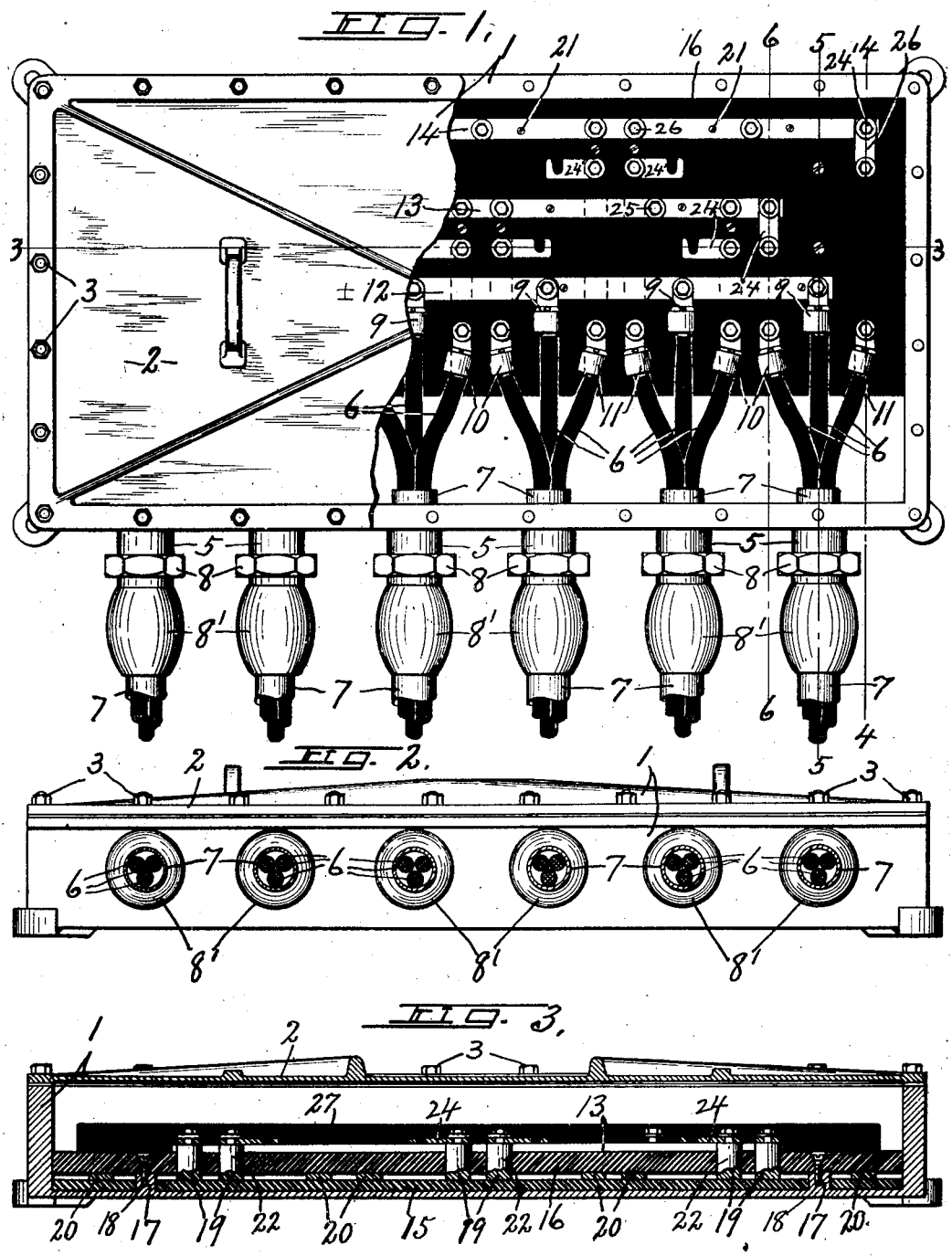

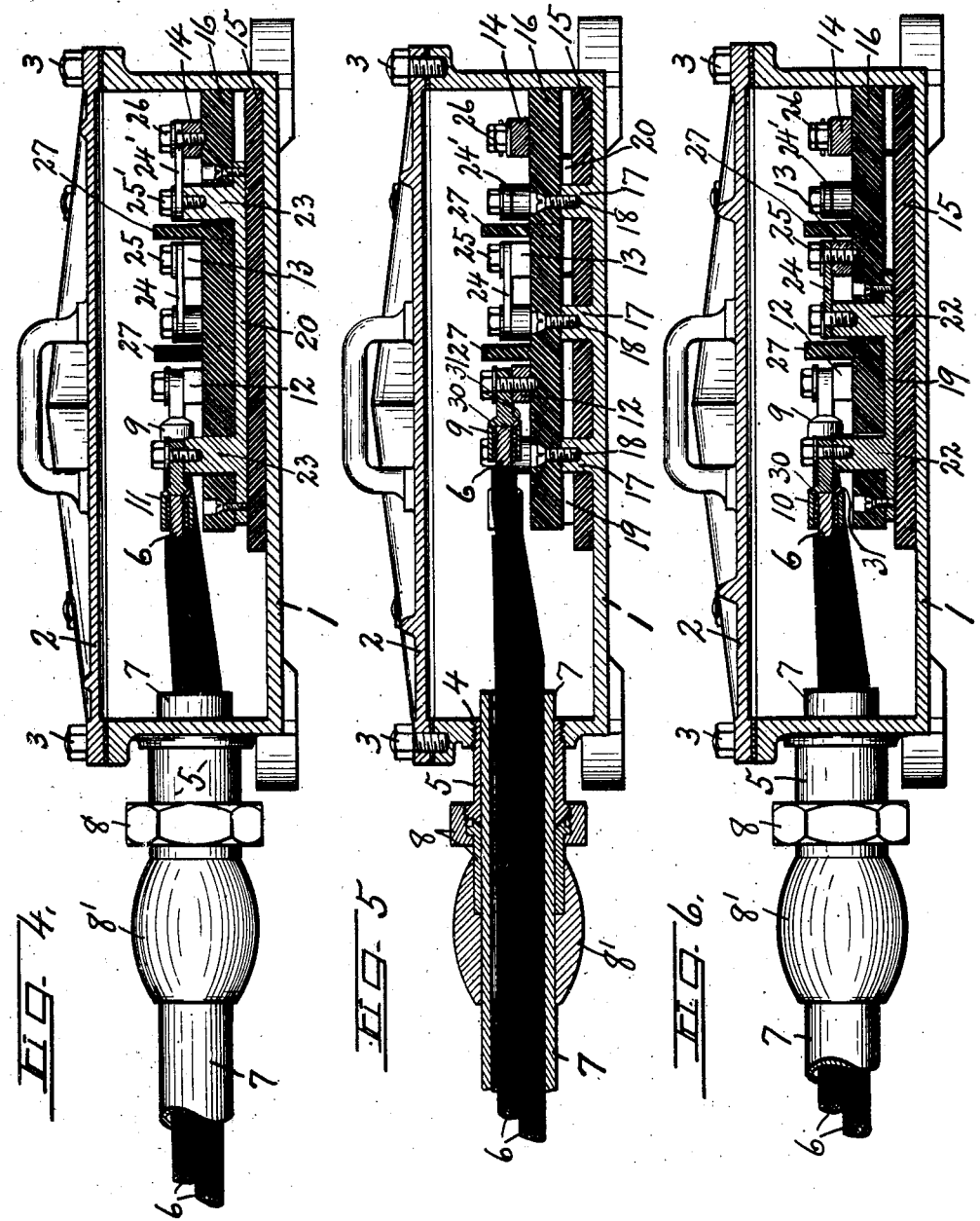

UNITED STATES PATENT OFFICE.

SCOTT A. HUNTINGTON, OF SYRACUSE, NEW YORK.

JUNCTION-BOX.

1,154,773.   Specification of Letters Patent.   Patented Sept. 28, 1915.

Application filed February 18, 1913. Serial No. 749,081.

*To all whom it may concern:*

Be it known that I, SCOTT A. HUNTINGTON, of Syracuse, in the county of Onondaga, in the State of New York, have invented new and useful Improvements in Junction-Boxes, of which the following, taken in connection with the accompanying drawings, is a full, clear, and exact description.

This invention relates to certain improvements in underground electrical junction boxes adapted to be installed in the man-holes or wells to which the underground conduits lead for the reception and proper electrical connection of a multiplicity of electric cables forming a part of a lighting or power-distributing system.

The main object is to permit a relatively large number of cables to be brought into the junction box through a relatively small number of openings in one side thereof and at the same time to systematize the arrangement of the entering cables so as to establish more direct connection with their attaching members than has heretofore been practised, thereby reducing to a minimum the time and labor necessary to connect said cables to their respective bus-bars or other current distributing conductors which form a part of the junction box.

In other words, I have sought to locate the terminal connections of the cables with the bus-bars as nearly as possible in a direct line with the entrance openings in the side of the case and to render such connections adjustable, so as to avoid short or excessive bends of the ends of the cables within the box and, at the same time, permitting parts of the entrance couplings to be more easily and quickly assembled and connected to the box with greater assurance of forming tight joints to exclude water or gas from the interior of said box.

Another object is to render the cables and pipe connections readily accessible for removal or replacement individually without disturbing others and also to strengthen the connections between the cables and bus-bars and also between the cable pipes and boxes.

A still further object is to enable load tests to be made on any circuit leading to or from the box without breaking such circuit.

Other objects and uses relating to specific parts of the junction box will be brought out in the following description.

In the drawings—Figure 1 is a front face view of my improved junction box showing the cover as partly broken away to disclose the interior connections of the cables. Fig. 2 is an inverted plan of the same junction box. Fig. 3 is a horizontal sectional view taken on line 3—3, Fig. 1. Figs. 4, 5, and 6 are transverse sectional views taken respectively on lines 4—4, 5—5, and 6—6, Fig. 1.

This distributing box is adapted to be fixedly installed as a unit within a suitable underground well or man-hole to which a part of the system of subway conduits may lead and preferably comprises a substantially rectangular cast metal case —1— having a cover —2— of the same material secured thereto by bolts —3— or equivalent fastening means so as to form a water and gas tight joint, the entire case being thus protected against the entrance of gas or moisture.

This case is comparatively shallow from the front or cover side to the opposite or rear side and is preferably arranged edge-wise vertically with its back secured by suitable fastening means (not shown) to one of the upright sides of the well but may be otherwise disposed to conform to the position or angle of entrance of the cables from the conduits to the well.

One of the longitudinal sides and preferably the bottom of the case is provided with a series of parallel entrance openings —4— spaced uniform distances apart in a straight line from end to end of the box and threaded for receiving a corresponding number of tubular coupling members or bushings —5— which are threaded at one end and screwed into their respective openings to form water and gas tight joints.

Each opening —4— and its tubular bushing —5— is adapted to receive a plurality of, in this instance three, separately insulated electric cables —6— and a lead pipe or casing —7— in which the cables are inclosed, the adjacent end of each lead casing being passed through its bushing —5— with an easy sliding fit to protrude slightly into the box and is securely coupled to said bushing by a coupling-union —8— and a solder joint —8'— all of which parts are assembled so as to exclude moisture and gas from the cables and interior of the box.

The ends of the lead pipes which are joined to the junction box are cut short of the corresponding ends of the cables which they inclose so that these ends of the cables extend some distance into the interior of the box where they may be cut to the desired length and bared of insulation for electrical connection with laterally swinging terminal sockets —9—, —10— and —11— which in turn are electrically connected in a manner presently described to suitable bus-bars —12—, —13— and —14—.

Secured within and to the bottom of the box —1— is a pair of insulating plates —15— and —16— which are coextensive in length with, but of considerably less width than the corresponding dimensions of the interior of the box and are also of less combined thickness than the depth of the box from front to rear so as to leave considerable space within the box at the bottom and front of the plates, bus-bars and terminal sockets for making the various connections, inspections and load tests with greater facility and convenience.

The plate —15— is held against the back or bottom of the box which is provided with integral bosses —17— projecting inwardly through apertures in said plate and beyond the front face thereof to form suitable supports for the other front plate —16—.

The plate —16— is secured to and against the inner ends of the bosses —17— by counter-sunk screws —18—, thus holding said plate —16— spaced apart from but parallel with the back-plate —15— for receiving suitable conducting bars —19— and —20— between them, said conducting bars forming electrical connections between their respective sets of terminals —10— and —11— and their corresponding bus-bars —13— and —14—. These connecting bars —19— and —20— are disposed at right angles to or transversely of the bus-bars and some distance apart from each other and from the bosses —17— between the insulating plates —15— and —16— for properly insulating them one from the other and from the case —1— and together with the insulating plate —15— are held in place by the front plate —16— and its fastening screws —18—.

The bus-bars —12—, —13— and —14— are secured in parallelism lengthwise of the box to the front face of the insulating plate —16— by suitable fastening means, as screws, —21—, but are spaced some distance apart to properly insulate them one from the other, the number of bus-bars corresponding to the number of cables of each set, in this instance three, and are of sufficient length to receive the terminal connections of all of the cables within the capacity of the junction box. These bus-bars are disposed in approximately the same plane as the entrance tubes for the cables to facilitate their connection therewith and are exposed to the cover-side of the box for easy access in making such connections and also for inspection and load testing when the cover is removed.

The bus-bar —12— nearest the inlet tubes for the cables is neutral for connection with the neutral cables of each set and, in order that these cables may be symmetrically arranged, the terminal sockets —9— for the neutral cables are pivoted directly to the bus-bar —12— approximately in line with the centers of their respective inlet tubes —5— and lead casings —7—, said sockets being arranged with their open ends facing the inlet tubes to permit the bared ends of the neutral wires to enter directly thereinto.

The cross bars —19— and —20— form the connections between the other terminal sockets of each set of cables and corresponding bus-bars —13— and —14— and are preferably made of cast metal, each of the bars —19— being provided with a pair of integral bosses —22— projecting forwardly through corresponding openings in and some distance beyond the front faces of the insulating plates —16— and at opposite sides of the bus-bar —12—, the front faces of said bosses being disposed in substantially the same plane as the corresponding faces of the bus-bars.

The terminal sockets —10—, each of which is secured to the bared end of one of the cables of each set, are pivoted to the front ends of the lower bosses —22— while the front ends of the upper bosses of the same bar —19— are normally connected by swinging members —24— to the middle bus-bar —13—, the members —24— being pivoted to their respective posts and provided with hook-shape extremities for interlocking connection with clamping bolts —25— on the bars —13—, thereby completing the electrical connection between the terminals —10— and middle bus-bar.

The bars —20— are similar to but longer than the bars —17— and serve to connect the terminal sockets of the remaining cables of each set with the bus-bars —14— and for this purpose are provided with integral bosses —23— extending through corresponding apertures in the insulating plate —16— and have their front faces disposed in a plane substantially coincident with that of the bus-bars, said bosses or posts being located respectively below the lower bus-bar —12— and between the bars —13— and —14—.

The terminal sockets —11— are pivotally secured to the front faces of the lowermost posts —23— while the upper posts are normally electrically connected by swinging members —24'— to the bars —14—, the members —24— being pivoted by bolts —25'— to the upper posts —23— and are provided with hook-shape extremities for interlocking engagement with a clamping bolt —26— on the upper bus-bar.

The terminal sockets —10— and —11— of each set of cables are located symmetrically at opposite sides of and below the terminal —9— for the neutral cable, thus bringing all of the terminals —10— and —11— in a straight line parallel with but below the lower bus-bar —12— nearest the entrance tubes where there is ample space for deflecting the corresponding ends of the cables laterally for proper connection with their respective sockets, which latter are pivoted to swing in a plane parallel with the bus-bars and substantially coincident with that of the entrance tubes so as to conform to the angle of divergence of the corresponding cables from the axis of the lead casing in which they are inclosed.

The insulating plate —16— is preferably provided with integral insulating barriers or partitions —27— extending lengthwise thereof between the bars —12— and adjacent upper posts —22— of the cross-bars —19— and also between the middle bus-bar —13— and adjacent upper posts —23— of the cross-bar —20—.

In connecting the cables, those carrying current of like potential are brought together in pairs, as for example the sockets —10—, which are adapted to be connected to the middle bus-bar —13—, are arranged adjacent each other while the terminal sockets —11— for the upper bus-bar —14— are also arranged adjacent so as to prevent any possibility of short circuits between terminals of different potential.

The object in connecting the cross-bars —19— and —20—, to their respective bus-bars —13— and —14— by means of swinging links —24— is to permit the use of load testing apparatus from one end of the cable terminals to the corresponding bus-bar without breaking the circuit, it being understood that when such tests are made, it is necessary to disconnect the swinging link —24— or —24'— from its bus-bar while the test is being made and that this may be done by simply loosening the adjacent clamping bolt —25— or —26— and swinging the corresponding link laterally out of engagement with the bus-bar and then restoring such link to its normal position after the test has been made.

After the bared terminal ends of the cables are inserted into their respective sockets, they are permanently secured thereto by soldering and, in order that the solder may be applied after the insertions are made, each terminal is provided with an inlet —30— for the molten solder and a vent —31— to permit the escape of air as the solder is poured into the socket.

It is now clear that the sides of all of the terminal sockets face the inlet tubes and may be adjusted laterally to conform to the angle of divergence of any of the cables which they are adapted to receive, thus permitting the connection to be made easily and quickly and without necessitating any short or excessive bend of the inner ends of the cables. The use of these swinging terminals also permits the cables to be cut to the proper length after the insertion of the cable into the box, the entire arrangement of the entrance tubes, cable connections and bus-bars being symmetrical and convenient for making the connections and load tests and inspection of any one cable without disturbing the others.

What I claim is:

1. In combination with a water-tight junction box having cable openings in one side and a cover for the front, insulator-plates secured in spaced relation one over the other to the back of the box, bus-bars secured in spaced relation and in parallelism to the front face of the front plate so as to face the cover, conducting bars clamped between said plates and each provided with a pair of binding posts extending through openings in the front plate, cable terminals each connected to one of the binding posts, and pivoted conducting members connecting the other binding posts to their respective bus-bars.

2. In combination with a water-tight junction box and a cover therefor, the box being provided with cable openings in one side, insulator-plates secured in spaced relation one to the other to the back of the box, bus-bars secured side by side in spaced relation to the front face of the front plate, said front plate being provided with forwardly projecting partitions between adjacent bus-bars, and conducting bars clamped between and by said plates and each provided with a pair of binding posts projecting through openings in the front plate, one of the binding posts of each conducting bar being electrically connected to its corresponding bus-bar in front of the front plate, and cable terminals connected to the other binding posts.

3. In combination with a water-tight junction box having cable openings in one side and a cover for the front thereof, insulator-plates secured in spaced relation one over the other to the back of the box, parallel bus-bars secured to the front face of the front plate at different distances from the side of the box having the cable openings, the bus-bar nearest such side being the neutral bar, electric conducting cross-bars clamped by and between said plates and extending to opposite sides of the neutral bus-bar, each cross-bar having a binding post extending through the front plate between the neutral bus-bar and side of the box having the cable openings and provided with a terminal connection for one of the cables, the opposite end of each bar being provided with a binding post extending through the front plate and electrically connected to its corresponding bus-bar.

In witness whereof I have hereunto set my hand this 12th day of February, 1913.

SCOTT A. HUNTINGTON.

Witnesses:
  H. E. CHASE,
  EVA E. GREENLEAF.